(12) United States Patent
Jiang

(10) Patent No.: US 11,959,335 B1
(45) Date of Patent: Apr. 16, 2024

(54) MANUAL SWITCHING TYPE DRIVE DEVICE

(71) Applicant: NINGBO SUNFREE MOTOR TECHNOLOGY COMPANY LIMITED, Ningbo (CN)

(72) Inventor: Chun Jiang, Ningbo (CN)

(73) Assignee: NINGBO SUNFREE MOTOR TECHNOLOGY COMPANY LIMITED, Ningbo (CN)

( * ) Notice: Subject to any disclaimer, the term of this patent is extended or adjusted under 35 U.S.C. 154(b) by 0 days.

(21) Appl. No.: 18/384,821

(22) Filed: Oct. 27, 2023

(30) Foreign Application Priority Data

Feb. 4, 2023 (CN) .......................... 202320186713.6

(51) Int. Cl.
*E06B 9/72* (2006.01)
*E06B 9/40* (2006.01)

(52) U.S. Cl.
CPC . *E06B 9/72* (2013.01); *E06B 9/40* (2013.01)

(58) Field of Classification Search
CPC ........ E06B 9/72; E06B 9/40; E06B 2009/402; E06B 9/74; A47H 5/02
USPC ........................................................ 160/310
See application file for complete search history.

(56) References Cited

U.S. PATENT DOCUMENTS

| | | | | |
|---|---|---|---|---|
| 7,057,360 B1 * | 6/2006 | Hsu | .......................... | H02K 7/14 318/105 |
| 9,334,688 B2 * | 5/2016 | Colson | ...................... | E06B 9/42 |
| 10,119,331 B2 * | 11/2018 | Desfossez | ................. | E06B 9/68 |
| 2013/0133447 A1 * | 5/2013 | Leivenzon | ................ | E06B 9/72 74/405 |
| 2014/0262058 A1 * | 9/2014 | Mullet | ...................... | E06B 9/42 160/7 |
| 2015/0226001 A1 * | 8/2015 | Adams | ....................... | E06B 9/72 160/84.02 |
| 2018/0106105 A1 * | 4/2018 | Anthony | .................. | H01H 5/00 |
| 2019/0100961 A1 * | 4/2019 | Kutell | ........................ | E06B 9/50 |
| 2019/0352964 A1 * | 11/2019 | Kasai | .......................... | E06B 9/72 |
| 2021/0203207 A1 * | 7/2021 | Jiang | .......................... | E06B 9/72 |
| 2021/0367542 A1 * | 11/2021 | Adams | ..................... | H02J 7/342 |
| 2023/0203883 A1 * | 6/2023 | Hebeisen | .................. | E06B 9/68 160/6 |

* cited by examiner

*Primary Examiner* — Beth A Stephan
(74) *Attorney, Agent, or Firm* — Juan Carlos A. Marquez; Marquez IP Law Office, PLLC

(57) ABSTRACT

A manual switching type drive device is provided which comprises an outer tube, and a speed reducer, a motor core, an electrical control board, a power source and a travel unit are provided in the outer tube; the electrical control board is fixed through a fixing bracket inside the outer tube; the electrical control board is provided with a voltage sensor for controlling the stop and start of the drive device; the electrical control board is further provided with a trigger switch; the fixing bracket is provided with a slide piece which can be abutted against or separated from the trigger switch; the slide piece is connected with an actuator capable of driving the slide piece to abut against or separate from the trigger switch; an end of the actuator penetrates through the travel unit and naturally drops down for hand pull for a more convenient operating.

9 Claims, 5 Drawing Sheets

MANUAL SWITCHING TYPE DRIVE DEVICE

This application is based upon and claims priority to Chinese Patent Application No. 202320186713.6, filed on Feb. 4, 2023, the entire contents of which are incorporated herein by reference.

TECHNICAL FIELD

The present disclosure relates to the technical field of drive devices and in particular to a manual switching type drive device.

BACKGROUND

Rolling shutter doors and windows are usually provided with a drive device which can drive the windows and doors to open or close, bringing significant conveniences to the lives of people. Generally, people can easily control the operation of the drive device by using a terminal such as a remote controller or a smart phone or the like. When a failure such as power outage or no signal or the like occurs to the terminal, the drive device cannot be controlled to work normally.

In this case, it is awkward that you can neither close the windows and doors nor open them. In order to cope with the problems, a switch is usually disposed outside a travel unit of the drive device for the purpose of use in emergency. However, since the switch is mounted on the top of the windows or doors together with the drive device, people need to climb up to use it, bringing much inconvenience.

SUMMARY

For the above current situation of the prior arts, the technical problem to be solved by the present disclosure is to provide a manual switching type drive device, which is easy to operate. People may stand below windows or doors, operating the drive device manually without climbing.

The technical solution adopted by the present disclosure to address the technical problems is as follows: there is provided a manual switching type drive device, which comprises an outer tube in which a speed reducer, a motor core, an electrical control board, a power source and a travel unit are disposed. The electrical control board is fixed through a fixing bracket inside the outer tube. The electrical control board is provided with a voltage sensor for controlling the stop and start of the drive device. The electrical control board is further provided with a trigger switch to turn on or off a circuit such that the voltage sensor senses a change of a voltage. The fixing bracket is provided with a slide piece which can be abutted against or separated from the trigger switch to enable the trigger switch to turn on or off the circuit to change the voltage. The slide piece is connected with an actuator capable of driving the slide piece to abut against or separate from the trigger switch. An end of the actuator penetrates through the travel unit and naturally drops down for hand pull.

Furthermore, the actuator comprises a reset spring for driving the slide piece to separate from the trigger switch and a pull rope for pulling the slide piece to abut against the trigger switch. An end of the pull rope is fixed on the slide piece and the other end penetrates through the travel unit and then drops naturally down for hand pull.

Furthermore, the slide piece is provided with a groove for avoiding the trigger switch. An arc-shaped guide surface for abutting against the trigger switch is disposed at a side away from the pull rope inside the groove.

Furthermore, an end of the slide piece facing toward the pull rope is provided with a pull hole for binding the pull rope.

Furthermore, one end of the reset spring is abutted against an end of the slide piece facing toward the pull rope and the other end of the reset spring is abutted against a protrusion column of the fixing bracket.

Furthermore, the motor core and the power source both are electrically connected to the electrical control board. An output end of the motor core is connected to an input end of the speed reducer, and an output end of the speed reducer is exposed out of the outer tube; and the speed reducer and the motor core both are fixedly connected inside the outer tube.

Furthermore, the power source is mounted inside the fixing bracket.

Furthermore, a head portion of the travel unit is exposed out of the outer tube. A neck portion of the travel unit is connected with the outer tube in an insertion manner. A guide column for the pull rope to change direction is disposed inside the travel unit. A through hole for the pull rope to run through is disposed on a sidewall of the head portion of the travel unit.

Furthermore, the fixing bracket comprises detachable upper shell and lower shell.

Compared with the prior arts, the present disclosure has the following advantages: in the present disclosure, an actuator for penetrating the travel unit and naturally dropping down is disposed and thus a user can conveniently stand below a window or door, pulling it by hand without climbing. The user pulls the actuator which then drives the slide piece to abut against the trigger switch to turn on the circuit so as to generate a voltage change. The voltage sensor senses the change and controls the corresponding operation of the drive device through the electrical control board. When the actuator is released, the slide piece is separated from the trigger switch to enable the trigger switch to turn off the circuit. The turning on/off of the trigger switch is one operation, which corresponds to the pull and release of the actuator. In this process, the voltage sensor senses a change of the voltage, and the electrical control board, based on a signal of the voltage sensor, controls corresponding operation of the drive device, making the operation easy. In addition, disposing the trigger switch, the slide piece and a part of the actuator directly on the outer tube rather than on the travel unit makes the exposed part of the travel unit thinner, such that a side gap at the time of mounting a window or door can be made smaller, making it less likely to leak light.

BRIEF DESCRIPTION OF THE DRAWINGS

In order to describe the technical solutions in the embodiments of the present disclosure or the prior art more clearly, brief descriptions will be made below to the accompanying drawings involved in descriptions of the embodiments or the prior art. Obviously, the accompanying drawings are merely illustrative, and other drawings may also be obtained by those skilled in the art based on these drawings without making creative work.

The structures, scales, sizes and the like depicted in the specification are only used by those skilled in the art to know and read the contents disclosed by the specification rather than to limit the embodiments of the present disclosure. Therefore, the structures, scales, sizes and the like do not have technically substantive meanings. Any modification, changes or adjustment to the structures, the scales and sizes shall all fall within the scope of protection covered by the technical contents disclosed by the present disclosure without affecting the effects and the purposes achieved by the present disclosure.

Figure 1:
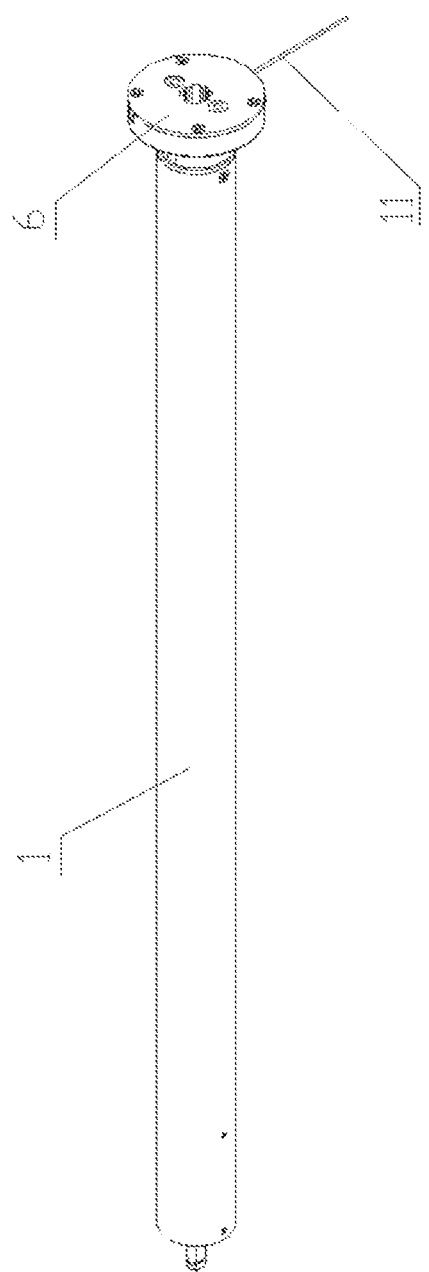
FIG. 1 is a structural schematic diagram of the present disclosure.
Figure 2:
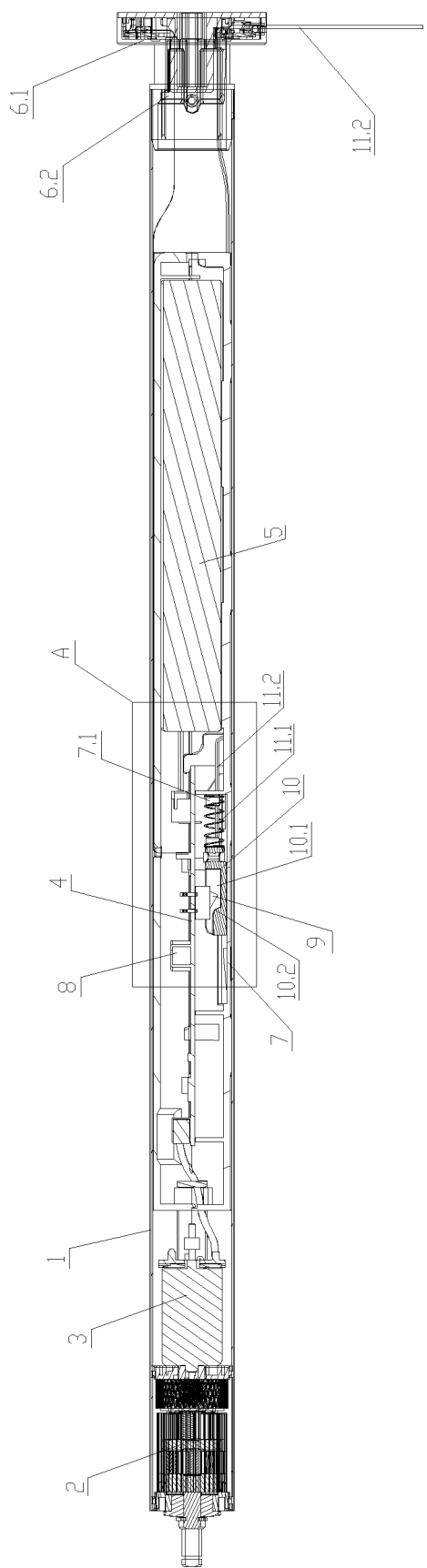
FIG. 2 is a sectional view of the present disclosure.
Figure 3:
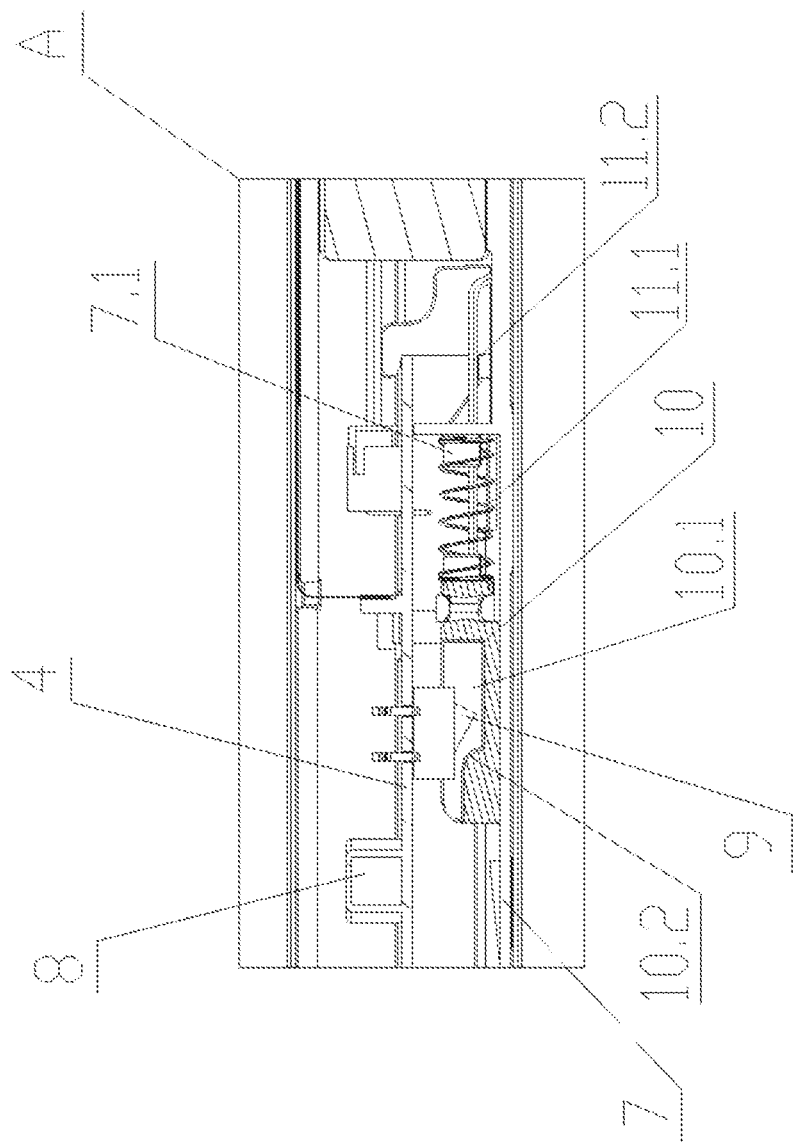
FIG. 3 is an enlarged view of a position A in FIG. 2.
Figure 4:
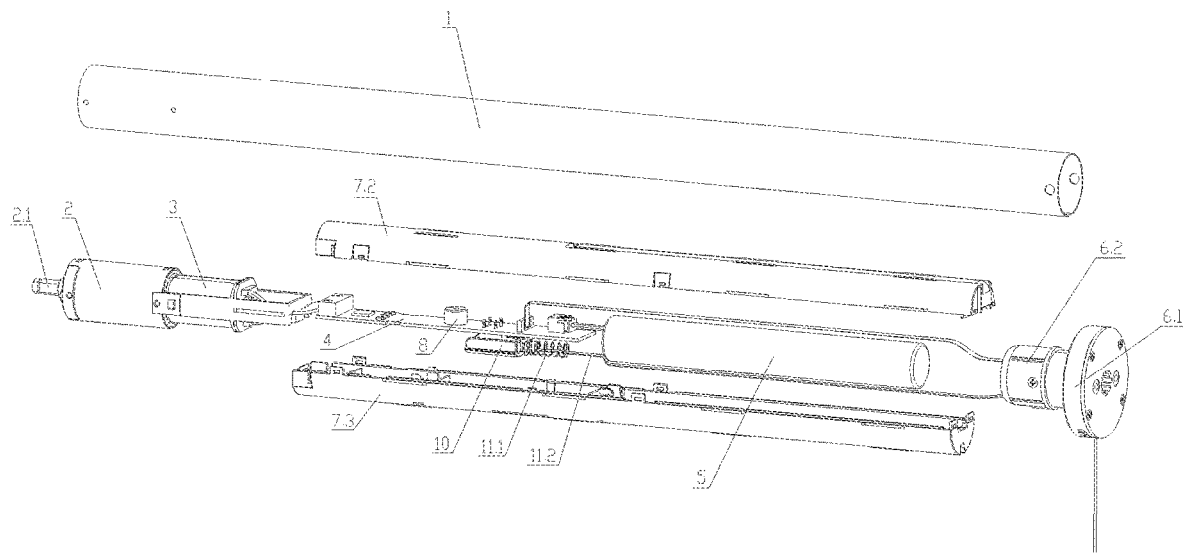
FIG. 4 is an exploded view of the present disclosure.
Figure 5:
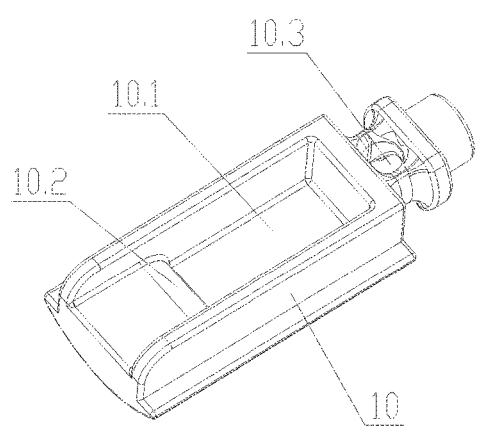
FIG. 5 is a structural schematic diagram illustrating a slide piece according to the present disclosure.

The numerals of the drawings are described below: 1. outer tube, 2. speed reducer, 2.1 output end of the speed reducer, 3. motor core, 4. electrical control board, 5. power source, 6. travel unit, 6.1 head portion, 6.2 neck portion 6.3 guide column, 6.4 through hole, 7. fixing bracket, 7.1 protrusion column, 7.2 upper shell, 7.3 lower shell, 8. voltage sensor, 9. trigger switch, 10. slide piece, 10.1 groove, 10.2 arc-shaped guide surface, 10.3 pull hole, 11. actuator, 11.1 reset spring, 11.2 pull rope and 12 PCB board.

EMBODIMENTS

The present disclosure will be further described below in combination with specific embodiments.

In the descriptions of the present disclosure, it is understood that orientation or positional relationship indicated by the terms such as "central", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", and "circumferential" is used only for ease of descriptions and simplification of descriptions and does not indicate or imply that the indicated devices or elements must have a particular orientation, or be constructed or operated in a particular orientation. Therefore, such terms shall not be understood as limiting of the present disclosure.

Further, the terms "first" and "second" are used for descriptions only and shall not be understood as indicating or implying relative importance or implicitly indicating the number of the indicated features. As a result, the features defined by "first" and "second" may explicitly or implicitly include at least one feature. In the descriptions of the present disclosure, "plural" has a meaning of at least two, for example, two or three or the like, unless otherwise clearly stated.

In the present disclosure, unless otherwise clearly stated or defined, the terms "mount", "connect", "couple", and "fix" and the like shall be understood in a broad sense, for example, may be fixed connection, or detachable connection, or formed into one piece; or may be mechanical connection, or electrical connection; or direct connection or indirect connection through an intermediate medium, or may be internal communication between two elements or mutual interaction of two elements, unless otherwise stated. Those skilled in the art may understand the specific meanings of the above terms in the present disclosure according to actual situations.

In the present disclosure, unless otherwise clearly stated or defined, the first feature being "on" or "below" the second feature refers to that the first feature and the second feature are in direct contact, or the first feature and the second feature are in indirect contact through an intermediate medium. Furthermore, the first feature being "above" or "on" the second feature refers to that the first feature is exactly above or obliquely above the second feature, or only refers to that the first feature has a higher horizontal height than the second feature. The first feature being "under" or "below" the second feature refers to that the first feature is exactly under or obliquely below the second feature, or only refers to that the first feature has a smaller horizontal height than the second feature.

As shown in FIGS. 1 to 6, the present disclosure provides a manual switching type drive device, which comprises an outer tube 1 in which a speed reducer 2, a motor core 3, an electrical control board 4, a power source 5 and a travel unit 6 are disposed. The motor core 3 and the power source 5 both are electrically connected to the electrical control board 4. The electrical control board 4 is a microcontroller unit (MCU) board. An output end of the motor core 3 is connected to an input end of the speed reducer 2, and an output end of 2.1 the speed reducer 2 is exposed out of the outer tube 1 for the purpose of transmission. The speed reducer 2 and the motor core 3 both are fixedly connected inside the outer tube 1. The electrical control board 4 is fixed through a fixing bracket inside the outer tube 1. The electrical control board 4 is provided with a voltage sensor 8 for controlling the stop and start of the drive device. The electrical control board 4 is further provided with a trigger switch 9 to turn on or off a circuit such that the voltage sensor 8 senses a change of a voltage. The fixing bracket 7 is provided with a slide piece 10 which can be abutted against or separated from the trigger switch 9 to enable the trigger switch 9 to turn on or off the circuit to change the voltage. The slide piece 10 is connected with an actuator 11 capable of driving the slide piece 10 to abut against or separate from the trigger switch 9. An end of the actuator 11 penetrates through the travel unit 6 and naturally drops down for hand pull.

The actuator 11 comprises a reset spring 11.1 for driving the slide piece 10 to separate from the trigger switch 9 and a pull rope 11.2 for pulling the slide piece 10 to abut against the trigger switch 9. An end of the pull rope 11.2 is fixed on the slide piece 10 and the other end penetrates through the travel unit 6 and then drops naturally down for hand pull. Thus, a user can stand below a window or door, pulling the pull rope 11.2 easily. By pulling the pull rope 11.2, the user can drive the slide piece 10 to slide and then abut against the trigger switch 9 to supply power, whereas by releasing the pull rope 11.2, the pull rope 11.2 can reset under the action of the reset spring 11.1 to separate the slide piece 10 from the trigger switch 9 and thus turn off the circuit. Each time the actuator 11 pulls the slide piece 10 to turn on and off the trigger switch 9, the electrical control board 4 can, based on a signal of the voltage sensor 8, control corresponding operation of the drive device.

The slide piece 10 is provided with a groove 10.1 for avoiding the trigger switch 9. An arc-shaped guide surface 10.2 for abutting against the trigger switch 9 is disposed at a side away from the pull rope 11.2 inside the groove 10.2. When the pull rope 11.2 is pulled down, the slide piece 10 slides toward the pull rope 11.2 such that the arc-shaped guide surface 10.2 can push up the trigger switch 9 to supply power; when the pull rope 11.2 is released, the slide piece 10 resets under the action of the reset spring 11.1 such that the arc-shaped guide surface 10.2 can separate from the trigger switch 9 to enable the trigger switch 9 to drop down into the groove 10.1, so as to turn off the circuit. Furthermore, the structure of the groove 10.1 can, on one hand, avoid the trigger switch 9, and on the other hand, limit a slide range of the slide piece 10 to ensure the slide piece 10 will not excessively slide in a direction away from the pull rope 11.2 during resetting and the trigger switch 9 can abut against a side of the groove 10.1 close to the pull rope 11.2 to limit the excessive slide of the slide piece 10.

An end of the slide piece 10 facing toward the pull rope 11.2 is provided with a pull hole 10.3 for binding the pull rope 11.2.

One end of the reset spring 11.1 is abutted against an end of the slide piece 10 facing toward the pull rope 11.2 and the other end of the reset spring 11.1 is abutted against a protrusion column 7.1 of the fixing bracket 7. When the reset spring 11.1 is in a natural state, the groove 10.1 of the slide piece 10 is located under the trigger switch 9 to just avoid the trigger switch 9 so as to not supply power; when the pull rope 11.2 is pulled, the pull rope 11.2 pulls the slide piece 10 to squeeze the reset spring 11.1 and thus the arc-shaped guide surface 10.2 moves close to the trigger switch 9 and pushes up the trigger switch 9 to supply power.

The power source 5 is mounted inside the fixing bracket 7. The power source 5 and the electrical control board 4 are integrally mounted through the fixing bracket 7 and then mounted into the outer tube 1, such that the entire structure is more tidy and easier to assemble. Furthermore, the fixing bracket 7 can achieve the effect of dust prevention and scratch prevention. In this way, metal chips left in the outer tube 1 can be prevented from falling onto the electrical control board, so as to avoid failures such as short-circuiting; and scratches between the electrical control board 4/the power source 5 and the outer tube 1 during assembly of the electrical control board 4 and the power source 5 can be avoided so as to protect electric wires welded on both the power source 5 and the electrical control board 4 and plural gadgets welded on the electrical control board 4. Due to protection of the fixing bracket 7, the assembling efficiency can be increased without causing scratches.

Figure 6:
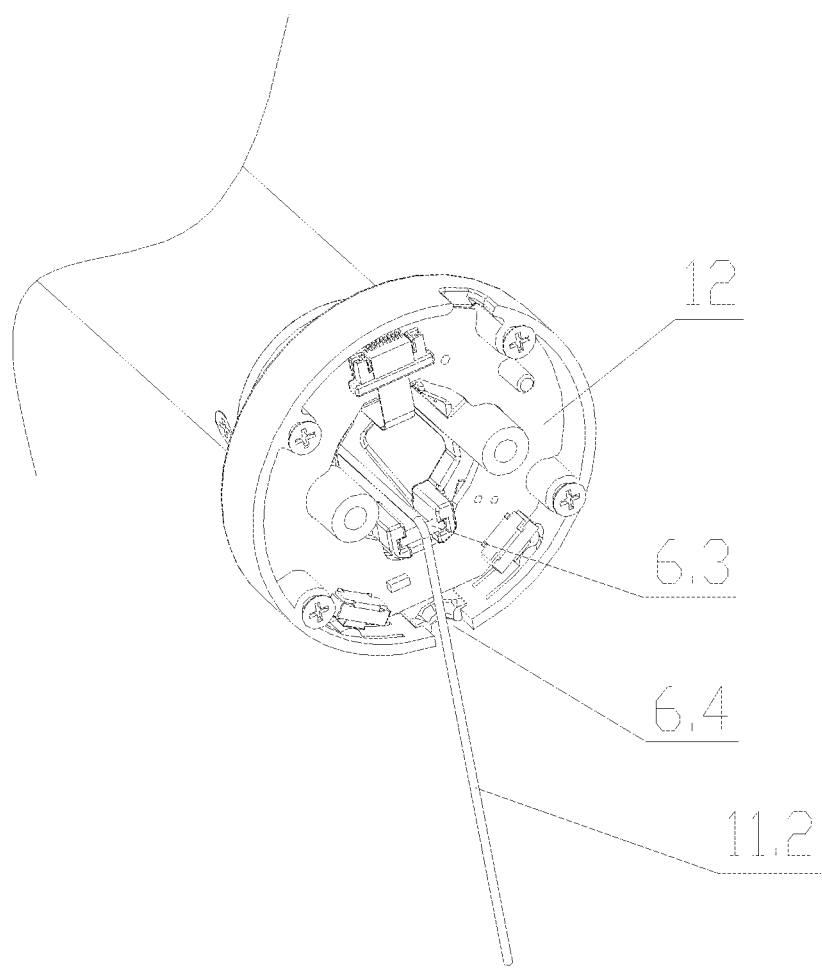
FIG. 6 is a schematic diagram illustrating an internal structure of a travel unit according to the present disclosure.

A head portion 6.1 of the travel unit 6 is exposed out of the outer tube 1. A printed circuit board (PCB) 12 is disposed inside the head portion 6.1 and connected with the electrical control board 4 through a cable. The disposal of a setting key, a data interface, an indicator lamp, and an antenna and the like on the PCB board 12 belongs to the prior arts and thus will not be described redundantly herein. A neck portion 6.2 of the travel unit 6 is connected with the outer tube 1 in an insertion manner. A guide column 6.3 for the pull rope 11.2 to change direction is disposed inside the travel unit 6. A through hole 6.4 for the pull rope 11.2 to run through is disposed on a sidewall of the head portion 6.1 of the travel unit 6, as indicated in FIG. 6.

The fixing bracket 7 comprises detachable upper shell 7.2 and lower shell 7.3 to facilitate disassembly and assembly.

In a case of use, a user may stand below a door or window, pulling the pull rope 11.2. The pull rope 11.2 drives the slide piece 10 to slide toward the pull rope 11.2 while overcoming an elastic force of the reset spring 11.1, such that the arc-shaped guide surface 10.2 on the slide piece 10 pushes up the trigger switch 9 to turn on the circuit. The voltage sensor 8 senses a change of a voltage, and the electrical control board 4, based on a signal of the voltage sensor 8, controls corresponding operation of the drive device. After the pull rope 11.2 is released, the slide piece 10, under the action of the reset spring 11.1, resets to enable the trigger switch 9 to drop down into the groove 10.1, so as to turn off the circuit. The turning on/off of the trigger switch 9 is one operation, which corresponds to the pull and release of the pull rope 11.2. In this process, the voltage sensor 8 senses a change of the voltage, and the electrical control board 4, based on a signal of the voltage sensor 8, controls corresponding operation of the drive device, making the operation easy. In practical applications, a corresponding operation circuit may be disposed on the electrical control board 4, which is, for example, as follows: when the pull rope 11.2 is pulled and released for the first time, the voltage sensor 8 senses a change of the voltage, and the electrical control board 4, based on a signal of the voltage sensor 8, controls the drive device to rotate forward; when the pull rope 11.2 is pulled and released for the second time, the electrical control board 4 controls the drive device to stop rotating; when the pull rope 11.2 is pulled and released for the third time, the electrical control board 4 controls the drive device to rotate backward; when the pull rope 11.2 is pulled and released for the fourth time, the electrical control board 4 controls the drive device to stop rotating; when the pull rope 11.2 is pulled and released for the fifth time, the electrical control board 4 controls the drive device to rotate forward and so on. Furthermore, when the drive device rotates forward to enable the door or window to run to an extreme position at an uppermost end or lowermost end, the electrical control board 4 controls the drive device to stop working. At this time, if the pull rope 11.2 is pulled and released, the electrical control board 4 controls the drive device to rotate backward to skip over the intermediate stop procedure. Similarly, when the drive device rotates backward to enable the door or window to run to an extreme position at an uppermost end or lowermost end, the electrical control board 4 controls the drive device to stop working. At this time, if the pull rope 11.2 is pulled and released, the electrical control board 4 controls the drive device to rotate forward to skip over the intermediate stop procedure.

The materials, reagents and experimental apparatuses involved in the embodiments of the present disclosure all are commercially-available products in the tubular motor field of windows and doors unless otherwise stated.

Finally, it should be noted that the above embodiments are used only to describe the technical solution of the present disclosure rather than to limit the present disclosure. Although detailed descriptions are made to the present disclosure by referring to the preceding embodiments, those skilled in the art should understand that modifications can be made to the technical solutions recorded in the above embodiments or equivalent substitutions can be made to partial technical features therein. These modifications or substitutions will not cause the essence of the corresponding technical solutions to depart from the spirit and scope of the technical solutions of the embodiments of the present disclosure.

The invention claimed is:

1. A manual switching type drive device, wherein the device comprises an outer tube, and a speed reducer, a motor core, an electrical control board, a power source—and a travel unit are provided in the outer tube; the travel unit is connected to one end of the outer tube proximate to the power supply; the electrical control board is fixed through a fixing bracket inside the outer tube a head portion of the travel unit positioned outside the outer tube; the electrical control board is provided with a voltage sensor for controlling the stop and start of the drive device; the electrical control board is further provided with a trigger switch to turn on or off a circuit so that the voltage sensor senses a change of a voltage; the fixing bracket is provided with a slide piece which can be abutted against or separated from the trigger switch to enable the trigger switch to turn on or off the circuit to change the voltage; the slide piece is connected with an actuator capable of driving the slide piece to abut against or separate from the trigger switch; an end of the actuator penetrates through the travel unit and extends below the travel unit.

2. The manual switching type drive device of claim 1, wherein the actuator comprises a reset spring for driving the slide piece to separate from the trigger switch and a pull rope for pulling the slide piece to abut against the trigger switch; an end of the pull rope is fixed on the slide piece and the other end penetrates through the travel unit and then extends below the travel unit.

3. The manual switching type drive device of claim 2, wherein the slide piece is provided with a groove for avoiding the trigger switch; an arc-shaped guide surface for abutting against the trigger switch is disposed at a side away from the pull rope inside the groove.

4. The manual switching type drive device of claim 2, wherein an end of the slide piece facing toward the pull rope is provided with a pull hole for binding the pull rope.

5. The manual switching type drive device of claim 2, wherein one end of the reset spring is abutted against an end of the slide piece facing toward the pull rope and the other end of the reset spring is abutted against a protrusion column of the fixing bracket.

6. The manual switching type drive device of claim 1, wherein the motor core and the power source both are electrically connected to the electrical control board; an output end of the motor core is connected to an input end of the speed reducer, and an output end of the speed reducer is exposed out of the outer tube; the speed reducer and the motor core both are fixedly connected inside the outer tube.

7. The manual switching type drive device of claim 1, wherein the power source is mounted inside the fixing bracket.

8. The manual switching type drive device of claim 2, wherein a head portion of the travel unit is exposed out of the outer tube; a neck portion of the travel unit is connected with the outer tube in an insertion manner; a guide column for the pull rope to change direction is disposed inside the travel unit; a through hole for the pull rope to run through is disposed on a sidewall of the head portion of the travel unit.

9. The manual switching type drive device of claim 1, wherein the fixing bracket comprises a detachable upper shell and a lower shell.

\* \* \* \* \*